United States Patent [19]

Lauckner et al.

[11] 4,413,886
[45] Nov. 8, 1983

[54] OPTICAL SWITCH

[75] Inventors: Joachim Lauckner, Korntal; Felix Lutz, Stuttgart; Gerhard Seibold, Remseck; Gerhard Wessel, Stuttgart; Hans Volz, Schwieberdingen, all of Fed. Rep. of Germany

[73] Assignee: International Standard Electric Corporation, New York, N.Y.

[21] Appl. No.: 228,599

[22] Filed: Jan. 26, 1981

[30] Foreign Application Priority Data

Jan. 29, 1980 [DE] Fed. Rep. of Germany ....... 3002956

[51] Int. Cl.$^3$ ............................................. G02F 1/05
[52] U.S. Cl. .................................................. 350/392
[58] Field of Search ............... 350/384, 392, 356, 396, 350/336; 358/213, 232, 241; 310/366, 368; 365/109, 117, 121; 174/68.5

[56] References Cited

U.S. PATENT DOCUMENTS

| | | | |
|---|---|---|---|
| 2,909,973 | 10/1959 | Koelsch, Jr. et al. | 350/392 |
| 3,663,088 | 5/1972 | Maldonado | 350/150 |
| 3,675,220 | 7/1972 | Snaper et al. | 365/121 |
| 3,695,747 | 10/1972 | Maldonado | 350/150 |
| 3,868,172 | 2/1975 | Ii | 350/150 |
| 3,873,187 | 3/1975 | Brooks | 350/356 |
| 3,945,715 | 3/1976 | Drake | 350/150 |
| 4,071,853 | 1/1978 | Yamanaka | 358/213 |

FOREIGN PATENT DOCUMENTS

| | | | |
|---|---|---|---|
| 53-124013 | 10/1978 | Japan | 358/213 |
| 528534 | 10/1976 | U.S.S.R. | 350/392 |
| 1316241 | of 0000 | United Kingdom . | |
| 1462100 | of 0000 | United Kingdom . | |

OTHER PUBLICATIONS

Cutchin et al. "Plzt Electrooptic Shutters: Applications" AP.P. Optics 8-1975, pp. 1866-1873.
I.B.M. Technical Disclosure Bulletin, vol. 15, No. 11, Apr. 1973, p. 3363.

*Primary Examiner*—William H. Punter
*Attorney, Agent, or Firm*—T. E. Kristofferson; T. L. Peterson

[57] ABSTRACT

An optical switch comprising a controlled ferroelectric light permeable ceramic provided with electrodes. To simplify the manufacture and to realize a larger switch, the invention provides a baseplate with electrodes and the ferroelectric ceramic is secured thereon in the form of one or more strips.

2 Claims, 3 Drawing Figures

OPTICAL SWITCH

BACKGROUND OF THE INVENTION

The present invention relates to an optical switch employing a controlled ferroelectric, light permeable ceramic provided with electrodes, which is arranged between a polarizer and an analyzer.

Such an optical switch is disclosed in "Transparente Keramik für die Optik", FUNKSCHAU 1975, No. 19, page 605. With the conventional optical switch in which PZT (transparent lead zirconate titanate) is used as the ferroelectric ceramic, the electrodes for controlling the double refraction of the ferroelectric ceramic are deposited in an interleaved form (interdigitated comb structures) directly onto the surface of the ceramic disk.

The setup of the conventional type of optical switch, as well as the arrangement of the electrodes directly upon the ceramic disk, have disadvantages which make it impossible to manufacture such types of optical switches for certain applications. Because of the unfavorable surface properties of the ferroelectric ceramic disk it is difficult to deposit electrodes having a good adherence to the ceramic for a sufficiently long period of time. Moreover, since the ceramic disks can only be manufactured with a reasonable expenditure and, consequently, economically up to a certain size (e.g. up to 10 cm $\phi$), it is not possible to manufacture optical switches of the conventional type having a length of e.g. 20 cm and more.

It is therefore the object of the present invention to improve the aforementioned type of optical switch in such a way that it can be easily manufactured economically to have larger dimensions.

SUMMARY OF THE INVENTION

According to the invention the aforementioned object is achieved by using in an optical switch a non-double-refracting base which is permeable to light and provided with electrodes and which, within the area of the electrodes, is provided with a restricted layer or strip of ferroelectric ceramic.

DESCRIPTION OF THE PREFERRED EMBODIMENTS

Figure 1:
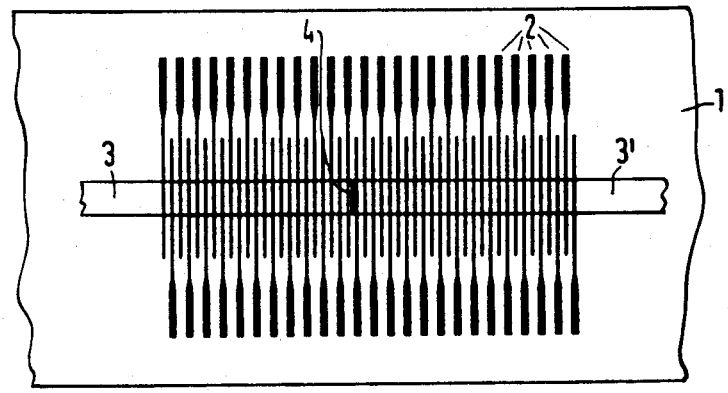
FIG. 1 shows a top plan view of that part of an optical switch, shown somewhat schematically, with which the double refraction thereof is controlled.
Figure 2:
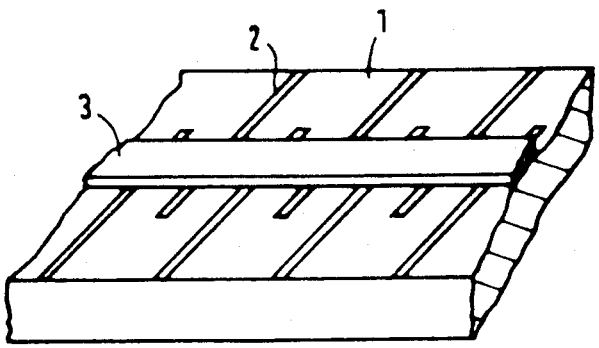
FIG. 2 is a fragmentary, perspective detailed showing of the arrangement illustrated in FIG. 1.

FIGS. 1 and 2 show one embodiment of the invention comprising a baseplate 1 which is provided with electrodes 2. To the baseplate 1 and over the electrodes there is secured a strip of ferroelectric ceramic. The electrodes are disposed perpendicular to the strip. The strip is arranged in line shape and may consist of several partial strips, e.g. the partial strips 3 and 3', which are butt-joined at 4. The ceramic strips may be secured to the baseplate either by a transparent non-double-refracting electrical non-conducting adhesive of high dielectric constant or with the aid of solder glass. The strips may also be in the form of thin films deposited on the baseplate by evaporation or the like.

The arrangement as shown in FIGS. 1 and 2 is intended for use with an optical switch whose length is much greater than its width. It comprises a very large number of electrodes which are intended to be applied to voltage in a timely succession, so that successively each time one point or strip shaped area of the ferroelectric ceramic strip is switched to become permeable to light. By way of example, the width of the individual electrodes may be approximately 50$\mu$ and the spacing between adjacent electrodes may be approximately 90$\mu$.

The baseplate 1, for example, may consist either of glass, plastic foils or plastic plates. The electrodes are manufactured in the manner known per se, from evaporated tin oxide, chromium-goldlayers or a sprayed-on copper film. They may be deposited either in a raised manner on the baseplate or disposed in corresponding recesses (not shown) previously produced in the baseplate, e.g. by being cut with a saw.

If the optical switch is designed in such a way that a cuvette (not shown) is formed by two baseplates provided with electrodes, the ceramic strip may be retained between the baseplates. In such an embodiment, the baseplates may simultaneously serve as both the polarizer and the analyzer, this being achieved in such a way that the baseplates either themselves have corresponding properties, or else are provided with layers having such properties.

Figure 3:
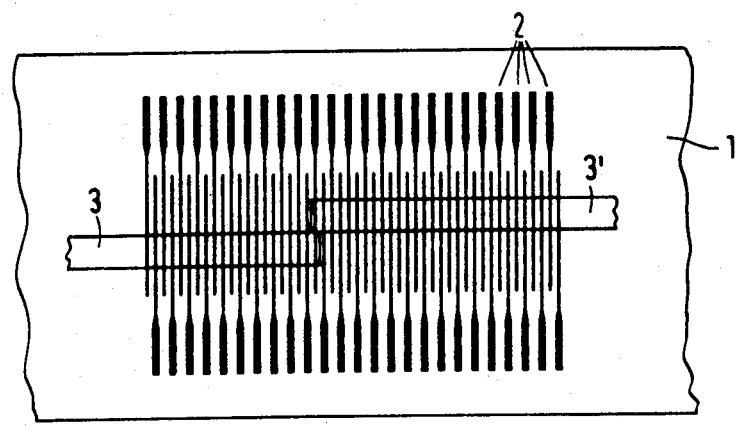
FIG. 3 shows an alternative embodiment of the arrangement according to the invention.

FIG. 3 shows an arrangement which is somewhat modified with respect to the arrangement shown in FIG. 1, in that the ceramic strips are not arranged in one line. In this embodiment, the ceramic strips, at the point where the ends thereof meet against one another, are arranged by being staggered by the width of one strip, and slightly overlapping one another.

What is claimed is:

1. In an optical switch:
   an elongated baseplate of transparent non-double-refracting material;
   first and second rows of interdigitated electrode strips of electrically conducting material on one surface of said baseplate extending lengthwise of said baseplate, said baseplate having a middle part and side parts on each side of said middle part running lengthwise of said baseplate;
   said electrode strips being separate from and parallel to each other;
   the strips of said first row extending over said middle part and one side part of said baseplate;
   the strips of said second row extending over said middle part and the other side part of said baseplate;
   each said electrode strip having an individual connection area on its respective side part of said baseplate; and
   a strip of ferroelectric light permeable ceramic extending lengthwise of said baseplate, said ceramic strip being substantially narrower than said elongated baseplate so that said strip extends over only said middle part, said ceramic strip overlying and transversing said electrode strips and being secured to said middle part of the said baseplate.

2. An optical switch as set forth in claim 1 wherein:
   there is provided a plurality of said ceramic strips of finite lengths which, at the places of joint, are staggered by the width of one strip in relation to one another, and arranged in an overlapping fashion.

* * * * *